United States Patent Office 3,493,432
Patented Feb. 3, 1970

3,493,432
METHOD FOR DISPOSAL OF SEMI-LIQUID WASTE MATTER OR CELLULAR FILM SACKS FOR DOMESTIC WASTE CONTROL AND DISPOSAL
William H. Stewart, % King Mfg. Co., Jaffrey, N.H. 03452
No Drawing. Filed Apr. 4, 1969, Ser. No. 813,757
Int. Cl. B08b 7/00
U.S. Cl. 134—7                    2 Claims

ABSTRACT OF THE DISCLOSURE

The method of forming a film enclosure in the nature of a bag or sack for the easy and odor-free disposal of moist waste material such as animal and human excrement and the like, through the use of a cellulosic powder so finely divided and desiccated as to change the surface moisture of the waste material when sprinkled thereon without any stirring or absorbency, sufficiently to form a continuous film about the mass, converting the same into a unitary mass which is more easily handled for quick disposal.

PREFERRED EMBODIMENT OF THE INVENTION

This application relates to a method for forming a novel continuous film or skin about a dirty wet mass for picking up the same, making it easy and free of odor to dispose of such litter as pet cats, excrement and the like material including regurgitated or vomited matter which are often necessary to be removed in or around the house or dwelling place. This detritus is usually in semi-liquid form and is extremely unpleasant and difficult to remove as for instance from furniture or carpets and floors.

The customary procedure for disposing of this material is usually to try to lift the mass from the rug with newsprint or a paper towel and this is very inadequate mainly due to the composition and smell encountered.

The new invention provides a desiccated comminuted very finely divided cellulosic dust or powder of e.g. wood or the like, preferably providing a pleasant odor of its own to overcome unpleasant and nauseating odors of human and animal waste matter which may be necessary to cope with, and when sprinkled or spread on the waste matter acts to absorb only surface moisture, forming a surface film enclosing the mass, providing a more controllable disposable mass which is easily lifted without the disadvantages of a runny mess having a disagreeable smell, etc., and which leaves the spot much cleaner than any other known method.

The cellulosic dust or powder under consideration is easily boxed, perfumed with any scent desired, and it is dried, with most all of the naturally contained moisture in it being removed.

The composition that goes to make up this invention is not to be confused with bedding or absorbent litter for poultry and animals, as bedding and litter substances as known in the art are absorbent and do not have the qualities needed to form a single film-sack for the simple cleaning task described above.

In my experiments to improve ordinary sawdust, a common cellular material for the purpose of handling domestic waste material found within the home, I have discovered that a dry film-forming cellular powder-like material can be poured on unmanageable waste masses to completely lock each mass within a single jacket of this skin-like film to facilitate the handling and disposition of unpleasant waste materials.

The controlling films I have developed for this use are found in the refinement and desiccation of wood powders, corn stalks and cane. For years I have been using fine wood sawdust from my basement bench saw to remove dog, cat and human waste from my home. This sawdust consisted of wood particles approximately of five to twenty mesh, depending on the saw blade being used at the time of the mishap.

In pouring these particles of sawdust into the masses to be removed, a small amount of controllable handling was developed as the sawdust was stirred completely throughout the mass to absorb all the moistures within the waste material.

It required time and patience to completely stir the large particles of sawdust throughout such an unpleasant mass to absorb all the moisture within it before control was possible. However, even this unpleasant rough method was better than other known methods for coping with the situation.

In the present invention, on the contrary, each particle becomes a minute link in a strong film or skin which forms an encasement completely covering and enveloping the exterior surfaces of each waste mass, producing instant control for removal.

This strong cellular skin film encasement which is formed with surface moisture in a matter of seconds excludes the old method of stirring or admixing in any way to absorb the entire moisture content of masses. The mass interior material is not affected at all.

The film which is formed with the finely divided powder is approximately 64th of an inch thick or less and the particles cling together to form a complete skin surface around the mass to be handled.

By applying particles of the correct size to the surface moisture found on waste matter, a controlling skin-like film automatically emerges over the mass which allows the control and disposal thereof as a package.

It is evident from these facts that the fineness of the wood particles should be equal in thickness and consistency to the moisture thickness when spread systematically to instantly change the exterior surface physical properties of waste masses from fluid to film.

This film, as developed, is tough enough to allow the mass to be rolled over without breaking out of the film until it is completely within the controlling sack created by the fine wood powder.

In my experiments I have learned that cellular wood particles do not form a complete film structure automatically on application unless the particle size is refined less than a twenty-five to thirty mesh size, smaller than sawdust.

At thirty mesh sizes the particles begin to join and to show traces of skim film forming characteristics; and the film becomes uniform and completely strong as the particles reach the fifty to sixty mesh size, this size being also very suitable for pouring evenly.

In preparing such a product, a pouring quality is desired to allow the complete, even coverage of a thin layer of film on the objects to be handled.

It was found that although the film-forming characteristics are also contained in finer wood powders such as 140 to 200 mesh, these very finely divided particles do not pour freely and sometimes fall in lump form which would require additional neutralizers for pouring or demand manual spreading.

Further experiments have shown these controlling films with desirous pouring qualities are readily found in wood dust particles between thirty and ninety mesh and at approximately sixty mesh, the particles produce the best complete pouring and filming characteristics obtainable from the powders, with the possible addition of pouring neutralizers being added in the form of dry powdered disinfectants, if finer meshes are more desirable for better films.

It is also necessary to use refined wood particles of low moisture content to enable the material to flow freely from the box and the dry character of the finely divided boxed wood powders must be protected from outside moisture in air-tight containers to maintain the skin filming and pouring quality manufactured into this product.

I have found wood powders with 80 to 90% of the natural moisture removed are very efficient in the formation of complete skin films for the control of waste materials. However, a dryness of lesser percentage is sometimes permissable for pouring and absorbing waste matter if the volume of powder is increased when poured. If wood powders with 70% of the moisture removed are being used, only 10% more volume is required for full complete control of the mass.

Such materials as clay, pellets, wood shavings, wastepaper, straw, peat moss, or damp heavy sawdust do not sufficiently mix with semi-liquid waste matter surfaces to change its appearance and form a film skin encasement to render it ready for disposal with a dustpan and broom as can be done with the desiccated wood powder or dust under consideration here.

It is believed that it will be seen that I have discovered a substantially perfect film sack method for the purpose at hand and that this controlled material used for the new method is inexpensive, easily packaged and transported for sale, and easily and more pleasantly used.

I claim:

1. The method of handling and treating moist waste materials such as animal and human excrement and the like which comprises the step of applying to and forming on the external moist surfaces only of such waste materials an evenly spread thin continuous cellular film sack of desiccated cellulosic powder, capable of containing and controlling the waste mass within a barrier for the single purpose of human control and disposal, the mesh size of said powder is in a range of from approximately 30–90.

2. The method of claim 1 wherein the mesh size of the powdered material is approximately 60.

References Cited

UNITED STATES PATENTS

| | | | |
|---|---|---|---|
| 2,029,992 | 2/1936 | Ellis | 134—7 |
| 2,344,247 | 3/1944 | Hopkins | 134—7 X |

SAMIH N. ZAHARNA, Primary Examiner

U.S. Cl. X.R.

117—25